Nov. 18, 1958  L. CYR  2,860,474
DRIVE FOR RIDING, DISK TYPE LAWN MOWER
Filed Oct. 15, 1957  4 Sheets-Sheet 1
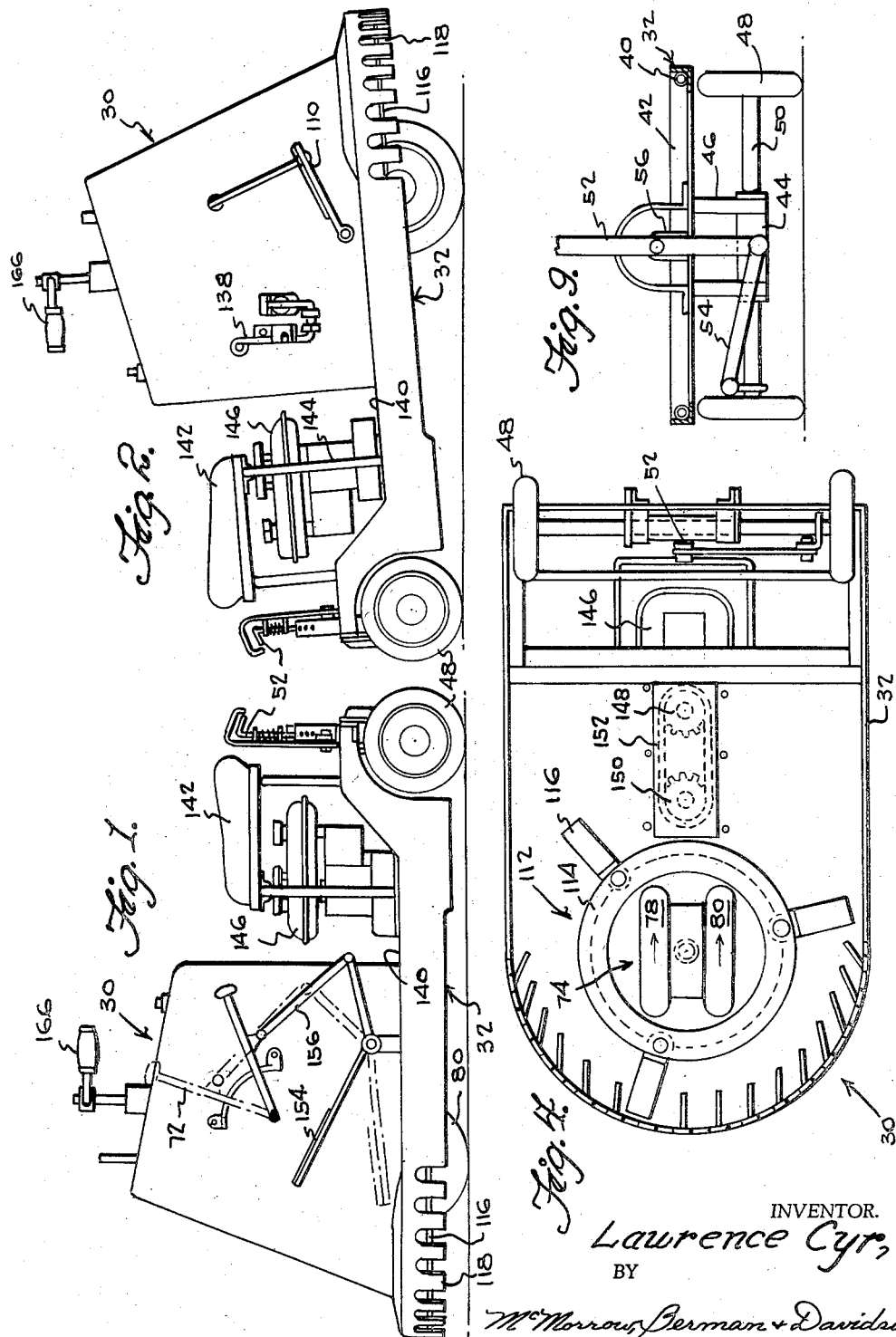
INVENTOR.
Lawrence Cyr,
BY
McMorrow, Berman & Davidson
ATTORNEYS Nov. 18, 1958  L. CYR  2,860,474
DRIVE FOR RIDING, DISK TYPE LAWN MOWER
Filed Oct. 15, 1957  4 Sheets-Sheet 2
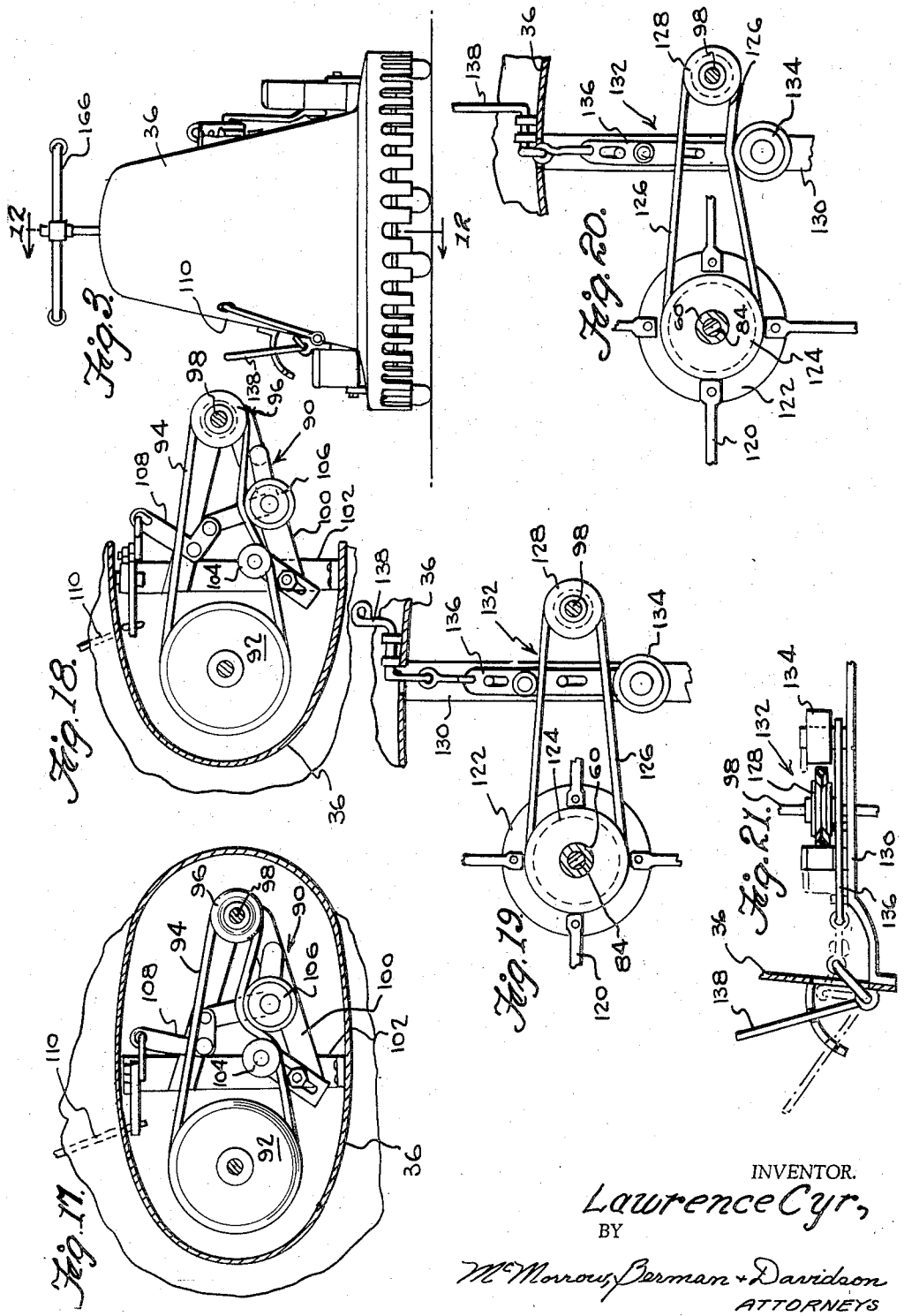
INVENTOR.
Lawrence Cyr,
BY
McMorrow, Berman + Davidson
ATTORNEYS

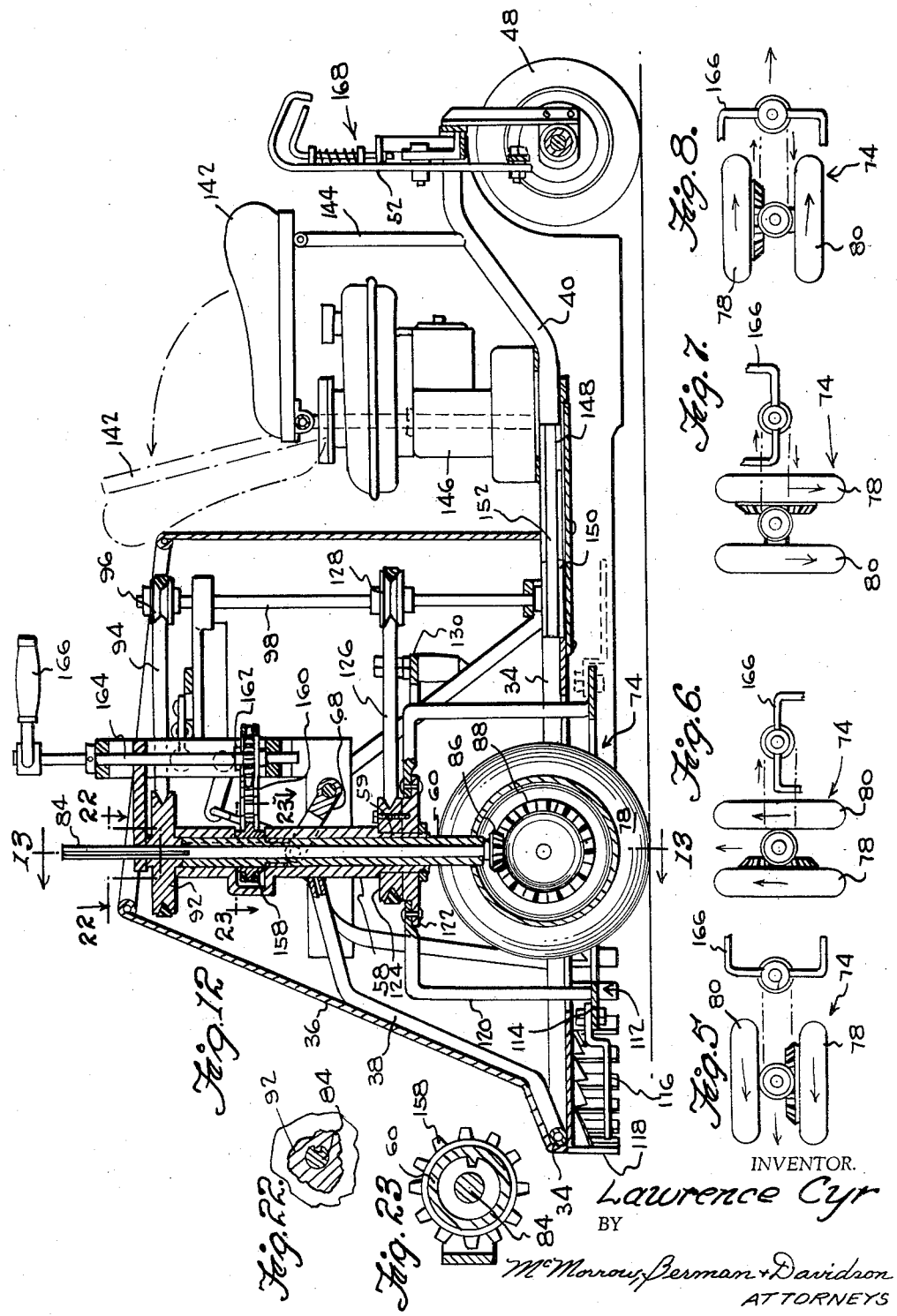

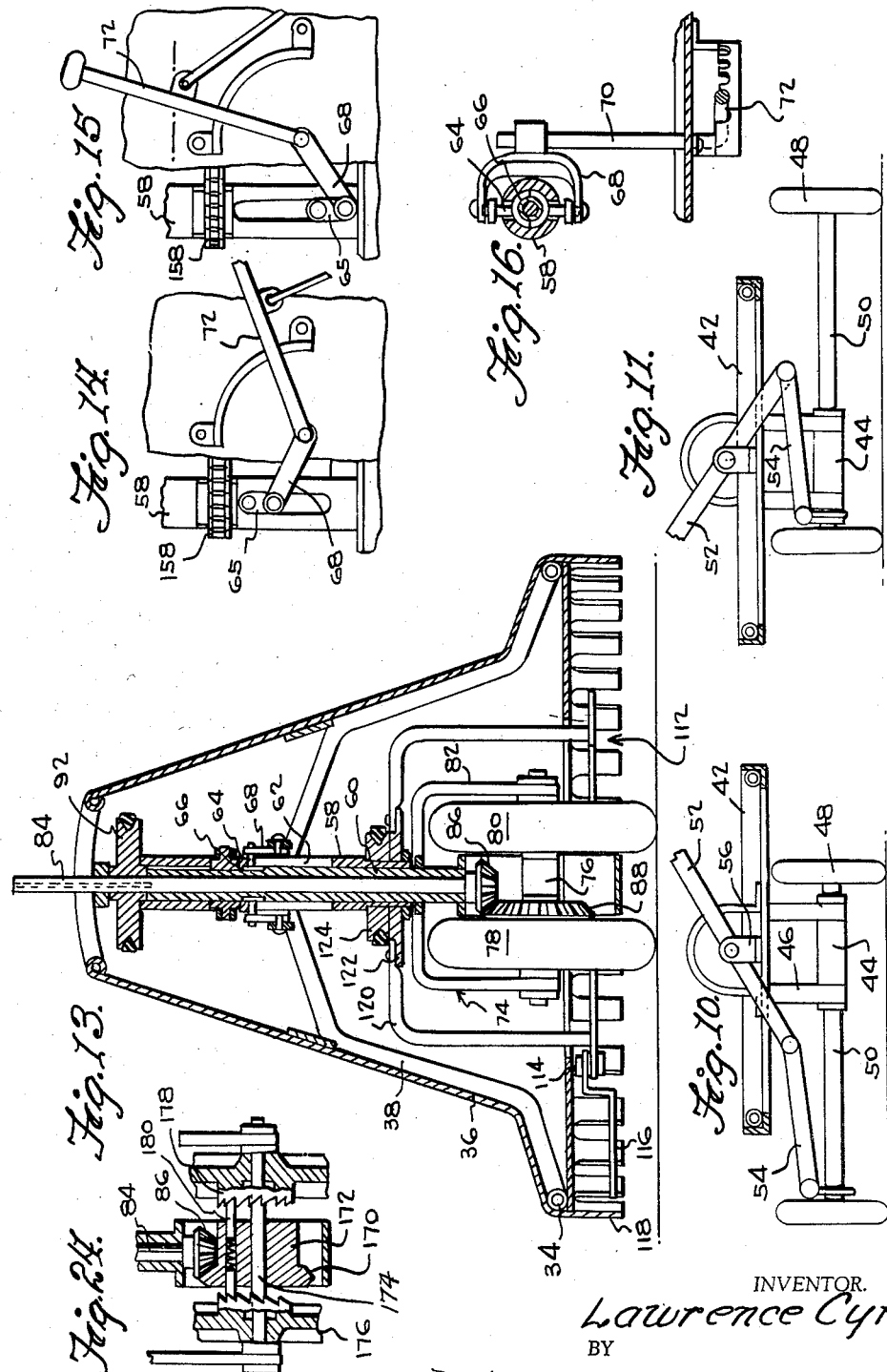

United States Patent Office 2,860,474
Patented Nov. 18, 1958

2,860,474

DRIVE FOR RIDING, DISK TYPE LAWN MOWER

Lawrence Cyr, Houston, Tex.

Application October 15, 1957, Serial No. 690,253

3 Claims. (Cl. 56—25.4)

The present invention relates to power lawn mowers of the riding type.

An object of the present invention is to provide a power lawn mower of the riding type which lends itself to efficient operation and ready maneuverability over lawn areas of any size.

Another object of the present invention is to provide a lawn mower of the riding type in which the blade assembly may be raised and lowered while operating, and one which may be turned around in its own length and readily reversed in operation.

These and other objects and advantages of the present invention will be fully apparent from the following description when taken in connection with the annexed drawings, in which:

Figure 1 is an elevational view of the power lawn mower of the present invention, taken from one side;

Figure 2 is an elevational view taken from the other side;

Figure 3 is a front elevational view;

Figure 4 is a bottom plan view with the drive assembly cover removed;

Figure 5 is a fragmentary plan view showing the drive wheels positioned for forward movement;

Figure 6 is a view similar to Figure 5, showing the drive wheels positioned for movement to the right;

Figure 7 is a view similar to Figures 5 and 6, showing the drive wheels positioned for movement to the left;

Figure 8 is a similar view showing the drive wheels positioned for rearward movement;

Figure 9 is an elevational view, with parts shown in section, of the rear wheels of the power mower in normal position;

Figure 10 is a view, with parts shown in section, similar to Figure 9, showing the wheels extended to the left;

Figure 11 is a view, with parts shown in section, similar to Figure 9, showing the wheels extended to the right;

Figure 12 is a sectional view, on an enlarged scale, taken on the line 12—12 of Figure 3;

Figure 13 is a sectional view taken on the line 13—13 of Figure 12;

Figure 14 is an enlarged fragmentary elevational view showing the lever means for raising and lowering the drive wheels, the wheels being in raised position;

Figure 15 is a similar view to Figure 14, the wheels being in the lowered position;

Figure 16 is a plan view of the apparatus shown in Figures 14 and 15;

Figure 17 is a view, with parts shown in section, of the drive and clutch means for the drive wheels in engaged condition;

Figure 18 is a view, with parts shown in section, similar to Figure 17, showing a drive and clutch means in unengaged condition;

Figure 19 is a view, with parts shown in section of the drive and clutch means for the cutter blade assembly in unengaged position;

Figure 20 is a view, with parts shown in section, similar to Figure 19, showing the drive and clutch means in engaged position;

Figure 21 is an elevational view, with parts shown in section, of the apparatus shown in Figures 19 and 20;

Figure 22 is a sectional view on an enlarged scale, taken on the line 22—22 of Figure 12;

Figure 23 is a sectional view, with parts shown in section, on an enlarged scale, taken on the line 23—23 of Figure 12; and Figure 24 is a fragmentary sectional view of a modified form of the drive means shown in Figure 13.

Referring in greater detail to the drawings in which like numerals indicate like parts throughout the several views, the power lawn mower of the present invention is designated generally by the reference numeral 30 and includes a horizontally disposed frame 32 having a forward end and a rearward end. The frame 32 consists in a tubular member 34 in the form of a ring extending about the periphery of a cone-shaped hood 36 which is supported upon intermediate portions of other tubular members 38 rising from the tubular member 34, as shown in Figures 12 and 13.

Other tubular members in the form of extensions 40 project rearwardly and are joined at their free ends by a rear cross member angle iron 42, as shown in Figure 9. A sleeve 44 is positioned below the angle iron 42 and is dependingly supported thereon by means of struts 46. A pair of ground-engaging wheels 48 are mounted on the ends of an axle 50 which is slidably positioned in the sleeve 44 and is shiftable to a left position shown in Figure 10 or to a right position shown in Figure 11 by means of a hand actuable lever 52 and an interconnecting link 54. The lever 52 is connected intermediate its ends in trunnions 56 projecting upwardly from the midpart of the angle iron 42.

A vertically disposed housing 58 is fixedly carried by the upper ends of the tubular members 38 of the frame 32 adjacent the forward end of the frame 32 and a rotatable sleeve 60 is positioned within the housing 58 and connected thereto for up and down vertical movement. The sides of the housing 58 are provided with opposed slots 62 in which are slidable, as shown in Figure 16, pins 64 carrying on their free ends a collar 66 seated in a complemental groove formed on the sleeve 60. The pins 64 are connected by links 65 to the free ends of the arms of a yoke member 68 carried on a shaft 70 which has a lever portion 72 on one end, Figures 17 and 15, exteriorly of the hood 36 and actuable by hand between the down position in Figure 14 and an up position in Figure 15.

A steerable and drivable wheel assembly 74 including an axle 76 and a pair of ground-engaging wheels 78 and 80 carried by the axle 76 is positioned within the frame 32 under the hood 36 adjacent the forward end of the frame and connected to the sleeve 60 for rotary movement with the latter. The means connecting the assembly 74 to the sleeve 60 includes an inverted U-shaped yoke 82 carried by the sleeve 60 inwardly of the lower end of the latter and having bearing means on the free ends of its arms for supporting the axle 76 for rotary movement therein. A rotatable driven shaft 84 extends through the sleeve 60 and has the portion adjacent the lower end exteriorly of and below the lower end of the sleeve 60 and has a portion adjacent the upper end projecting above the upper end of the sleeve 60. Means is provided drivingly connecting the lower end of the driven shaft 84 to the axle 76 and consists in a bevel gear 86 secured to the lower end of the shaft 84 and meshing with a ring bevel gear 88 mounted upon the axle 76 and fixedly secured to the one wheel 78.

Means is provided on the projecting upper end portion of the shaft 84 for imparting rotary movement to the shaft 84. Specifically, this means consists in a drive clutch mechanism designated generally by the reference numeral 90 and shown in detail in Figures 17 and 18. The mechanism 90 includes a pulley 92 secured by means of a spline to the upper end portion of the shaft 84 for sliding movement therealong when the shaft 84 and the sleeve 60 are shifted up and down within the housing 58. A belt 94 connects the pulley 92 to another pulley 96 mounted upon the upper end of a drive shaft 98. The upper end portion of the drive shaft 98 is supported in a vertical position in the apex of a V-shaped strut 100 which projects rearwardly from a cross frame member 102 carried by the frame 32. An adjustable idler pulley 104, carried by the member 102, engages the belt 94 and a clutch idler pulley 106, carried by clutch linkage 108, is engageable with the belt 94 when the linkage 108 is tightened as in Figure 17. In Figure 18 the linkage 108 is shifted to the position in which the idler pulley 106 is relatively free of engagement with the belt 94 and allows the same to slip on the main pulley 92, thereby preventing the drive wheels 78 and 80 coming to rest.

A foot-operated lever 110 exteriorly of the hood 36 has one end connected to the linkage 108 for effecting the shifting movement of the linkage 108 between clutch engaging and clutch disengaging positions.

A cutter blade assembly 112 including a ring 114 and a plurality of cutter blades 116 projecting in radial spaced relation from the ring 114 is positioned so that the ring 114 lies in a horizontal plane adjacent to and spaced above the lower end of the skirt 118 dependingly carried by the tubular member 34 and forming a part of the frame 32. The ring 114 encircles the steerable and drivable wheel assembly 74 and is connected to the sleeve 60 for rotary movement about the sleeve 60 to the axis. The ring 114 is carried by the free end of each of the long legs of a plurality of inverted L-shaped members 120 which are secured by the free ends of the short legs to a disc 122 carried by a mower drive pulley 124 which is rotatably mounted on a reduced portion 59 of the housing 58.

A flexible belt 126 connects the pulley 124 to a drive pulley 128 mounted upon the shaft 98 intermediate the ends of the latter. A cross frame member 130, part of the frame 32, supports a clutch mechanism 132, shown in Figures 19 to 21. The mechanism 132 includes an idler pulley 134 mounted upon a slide 136 carried by the cross frame member 130 and movable with the slide 136 from the position shown in Figure 19 in which the pulley 134 is out of engagement with the belt 126 to the position shown in Figure 20 in which the pulley 134 bears against the belt 126 and tightens the same about the pulley 124 which is operatively connected to the ring 114 for driving the latter.

A hand actuable lever 138 is positioned exteriorly of the hood 36 and has its lower end journaled in the hood 36 and operatively connected to the slide 136 for effecting the shifting movement of the slide 136 between the clutch engaging position and the clutch disengaging position.

A platform 140 is positioned on the frame 32 between the housing 58 and the rearward end of the frame 32 and a seat 142 rises from the platform 140 on legs 144. An internal combustion engine 146 is positioned beneath the seat 142 and has its drive pulley 148 at substantially the same level as the platform 140 and drivably connected to a driven pulley 150 by means of a flexible belt 152, the driven pulley 150 being securely attached to the lower end of the drive shaft 98.

The seat 142 is swingable from the full line position shown in Figure 12 to the dotted line position affording access to the engine 146.

Each of the hand actuable means for effecting the control of the mower is accessible to an occupant of the seat 142 when seated thereon. The lever 52, for instance, for shifting the rear wheels 48 laterally of the frame 32 is immediately behind the seat 142, as shown in Figures 1 and 2. The hand actuable lever 72, interconnected to a foot pedal 154 by means of linkage 156, is on the left side of the hood 36 forwardly of and adjacent to the seat 142. The lever 72 is operatively connected to the means for shifting the sleeve 60 within the housing 58 so that the mower blade assembly 112 may be raised from the position shown in Figure 1 in which the blades are in a position for making a two-inch cut in the grass to a raised position shown in Figure 2 in which the blades are in a position for cutting the grass at a height of six inches.

Means is provided for steering the steerable and drivable wheel assembly 74 from the seat 142 and consists in a sprocket 158 (Figure 23) carried by the sleeve 60 intermediate the ends of the latter and connected by a chain 160 to another sprocket 162 carried by the lower end of a steering column 164, the upper end of which carries handle bars 166, as shown in Figure 12.

In Figures 5 to 8 it will be seen that the assembly 74 is such that the wheels 78 and 80 may be rotated in a complete circle for driving the mower of the present invention forwardly, to the right, to the left, and rearwardly, as shown in Figures 5 to 8, respectively, in response to similar movement of the handle bars 166 as steered by an occupant of the seat 142 as desired.

In Figure 12 the numeral 168 represents generally a latch mechanism of the spring-biased pin type operatively connected to the lever 52 and the shifting mechanism of the wheels 48 for holding the wheels 48 in any selected position of lateral movement relative to the frame 32.

In Figure 24 an alternate form of the drive mechanism for the main drive wheels 78 and 80 is shown in which the bevel gear 86 on the lower end of the shaft 84 is in mesh with a bevel gear 170 carried on a hub 172 freely rotatable upon a shaft 174 which carries on its ends the wheels of the drive assembly, the wheels being shown broken away and designated generally by the reference numeral 176. Each wheel 176 carries on its inner face a ratchet ring 178 engaged by a dog 180 projecting perpendicularly from the hub 172. This mechanism is of conventional construction and permits one of the wheels 176 to rotate more rapidly than the other responsive to driving movement of the hub 172 when rotated by the shaft 84.

In operation, the occupant of the seat 142 controls the raising and lowering of the blade assembly by the hand operable lever 72 and foot pedal 154, either simultaneously or one or the other. The lever 138 on the right hand side of the hood 36 controls the starting and stopping of the mower blade assembly. The foot-operated lever 110 is operatively connected to the clutch mechanism for starting and stopping the rotation of the drive wheels 78 and 80. Steering of the mower is accomplished by turning the handle bars 166 for driving the mower forwardly, to either side in turns, or to the rear as desired by the operator. Unlatching and shifting of the lever 52 allows the wheels 48 to be shifted laterally with respect to the frame 32 so that the mower may be operated on sloping ground with the danger of the mower being overturned due to gravity greatly lessened.

While only preferred embodiments of the present invention have been shown and described, other embodiments are contemplated and numerous changes and modifications may be made therein without departing from the spirit of the invention as set forth in the appended claims.

What is claimed is:

1. In a power lawn mower, a horizontally disposed frame having a forward end and a rearward end, a pair of ground-engaging wheels supporting the rearward end of said frame, a vertically disposed housing fixedly carried by said frame adjacent the forward end thereof, a rotatable sleeve positioned within said housing and connected to said housing for vertical up and down movement, a steerable wheel assembly including an axle and a ground-engaging wheel carried by said axle positioned within said frame adjacent the forward end thereof and connected to said sleeve for movement with the latter, a rotatable driven shaft extending through said sleeve and having the lower end exteriorly of and below the lower end of said sleeve and having the portion adjacent the upper end projecting above the upper end of said sleeve, means drivably connecting the lower end of said driven shaft to said axle, means on the projecting upper end of said shaft for imparting rotary movement to the latter, and a cutter blade assembly including a ring having a plurality of cutter blades projecting in radial spaced relation therefrom positioned so that the ring lies in a horizontal plane adjacent to and spaced above the lower end of said frame and encircles said steerable wheel assembly and connected to said sleeve for rotary movement about said sleeve as an axis.

2. In a power lawn mower, a horizontally disposed frame having a forward end and a rearward end, a pair of ground-engaging wheels supporting the rearward end of said frame, a vertically disposed housing fixedly carried by said frame adjacent the forward end thereof, a rotatable sleeve positioned within said housing and connected to said housing for vertical up and down movement, a steerable wheel assembly including an axle and a ground-engaging wheel carried by said axle positioned within said frame adjacent the forward end thereof and connected to said sleeve for movement with the latter, a rotatable driven shaft extending through said sleeve and having the lower end exteriorly of and below the lower end of said sleeve and having the portion adjacent the upper end projecting above the upper end of said sleeve, means drivably connecting the lower end of said driven shaft to said axle, means on the projecting upper end of said shaft for imparting rotary movement to the latter, a cutter blade assembly including a ring having a plurality of cutter blades projecting in radial spaced relation therefrom positioned so that the ring lies in a horizontal plane adjacent to and spaced above the lower end of said frame and encircles said steerable wheel assembly and connected to said sleeve for rotary movement about said sleeve as an axis, and hand actuable means operatively connected to said sleeve for effecting the movement of the latter.

3. In a power lawn mower, a horizontally disposed frame having a forward end and a rearward end, a pair of ground-engaging wheels supporting the rearward end of said frame, a vertically disposed housing fixedly carried by said frame adjacent the forward end thereof, a rotatable sleeve positioned within said housing and connected to said housing for vertical up and down movement, a steerable wheel assembly including an axle and a ground-engaging wheel carried by said axle positioned within said frame adjacent the forward end thereof and connected to said sleeve for movement with the latter, a rotatable driven shaft extending through said sleeve and having the lower end exteriorly of and below the lower end of said sleeve and having the portion adjacent the upper end projecting above the upper end of said sleeve, means drivably connecting the lower end of said driven shaft to said axle, means on the projecting upper end of said shaft for imparting rotary movement to the latter, a cutter blade assembly including a ring having a plurality of cutter blades projecting in radial spaced relation therefrom positioned so that the ring lies in a horizontal plane adjacent to and spaced above the lower end of said frame and encircles said steerable wheel assembly and connected to said sleeve for rotary movement about said sleeve as an axis, a platform on said frame between said housing and the rearward end of said frame, a seat on said platform, and hand actuable means accessible to an occupant when occupying said seat and operatively connected to said sleeve for effecting the movement of the latter.

References Cited in the file of this patent

UNITED STATES PATENTS

| | | |
|---|---|---|
| 1,234,148 | Fisher | July 24, 1917 |
| 1,310,972 | Tisserant | July 22, 1919 |
| 1,833,844 | Lusse | Nov. 24, 1931 |
| 2,488,140 | Phillips et al. | Nov. 15, 1949 |
| 2,530,684 | Davis | Nov. 21, 1950 |